(12) United States Patent
Kikuchi et al.

(10) Patent No.: US 7,359,329 B2
(45) Date of Patent: Apr. 15, 2008

(54) DEVICE FOR DETECTING FAILURE OF COMMUNICATION NETWORK

(75) Inventors: Shinji Kikuchi, Kawasaki (JP); Hiroyuki Nakahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 721 days.

(21) Appl. No.: 10/796,059

(22) Filed: Mar. 10, 2004

(65) Prior Publication Data

US 2005/0041593 A1     Feb. 24, 2005

(30) Foreign Application Priority Data

Aug. 20, 2003   (JP)   ............................ 2003-296768

(51) Int. Cl.
H04L 1/00      (2006.01)
H04L 12/26     (2006.01)
G01R 31/08     (2006.01)
G06F 11/00     (2006.01)

(52) U.S. Cl. .................................... 370/242
(58) Field of Classification Search ................ 370/216, 370/241–245, 248–249
See application file for complete search history.

(56) References Cited

U.S. PATENT DOCUMENTS 6,009,080 A    12/1999   Hanazawa
6,141,326 A    10/2000   Minami
2003/0031126 A1*  2/2003   Mayweather et al. ........ 370/223

FOREIGN PATENT DOCUMENTS

JP    11-127155    5/1999
JP    11-261570    9/1999

OTHER PUBLICATIONS

S. Waldbusser, "Remote Network Monitoring Management Information Base", Network Working Group RFC 1757, Feb. 1995, pp. 1-68.
Network Associates, "Sniffer Technologies", Network Associates printed from World Wide Web Jul. 18, 2003.
J. Cao, et al., "Time-Varying Tomography: Router Link Data", Journal of the American Statistical Association, 2000, pp. 1-15.
C. Tebaldi, et al., "Bayesian Inference on Network Traffic Using Link Court Data", Journal of the American Statistical Association, Jun. 1998, pp. 1-28.
Notice of Rejection Grounds (Office Action) for Japanese Patent Application No. 2003-296768 mailed Jul. 18, 2006.

* cited by examiner

Primary Examiner—Kevin C. Harper
(74) Attorney, Agent, or Firm—Staas & Halsey LLP (57) ABSTRACT

Of a plurality of segments of traffic inside monitor target equipment, a flow rate of abnormal traffic is computed using traffic flow rate information in each interface of the monitor target equipment disposed within a communication network, and a network failure is detected using the obtained rate of flow.

2 Claims, 11 Drawing Sheets

DEVICE FOR DETECTING FAILURE OF COMMUNICATION NETWORK

BACKGROUND OF THE INVENTION

1. Field of the Invention

The present invention relates to an apparatus for detecting the failures of a communication network by analyzing the flow of traffic in the network.

2. Description of the Related Art

As technologies for detecting failures within a communication network, the following ones are conventionally known:

(1) Error Message Catching

A monitor device observes an error message generated by network equipment where there is a failure. When catching the generated error message, the equipment outputs an alarm and notifies the network manager of the failure (for example, see Non-patent Reference 1)

(2) Packet Capturer

Whether there is a failure is determined by catching packets flowing through a network and checking them one by one (for example, see Non-patent Reference 2).

Several network analyzing methods using a traffic matrix are also known (for example, see Non-patent References 3 and 4).

Non-patent Reference 1:
"Remote Network Monitoring Management Information Base", on line, RFC 1757, retrieved Jul. 18, 2003, Internet URL:http://www.faqs.org/rfcs/rfc1757.html Non-patent Reference 2:
"SnifferTechnologies (Registered trademark)", on line, Network Associates, Retrieved Jul. 18, 2003, Internet URL: http://www.nai.com/japan/products/sniffer/home. asp Non-Patent Reference 3:
J. Cao, D. Davis, S. Vander Wiel, and B. Yu, "Time-Varying Network Tomography: Router Link Data", Journal of the American Statistical Association, 200

Non-patent Reference 4:
C. Tebaldi and M. West, "Bayesian Inference on Network Traffic Using Link count Data", Journal of the American Statistical Association. 1988

However, the above-mentioned conventional failure detecting methods have the following problems.

In the above-mentioned method (1), for example, ICMP (Internet Control Message Protocol) destination unreachable errors or ICMP time-exceeded errors in an IP (internet protocol) are observed and the existence of failures is confirmed based on the generation/non-generation of those error messages.

However, there are a lot of failures that do not generate these error messages. These error messages exist steadily in a network due to the execution of a rout checking tool "trace route" by a user, the wrong designation of a destination IP address at the time of access and the like. Therefore, if the scale of a failure is small, the issuance frequency of these error messages is also small. Therefore, generally it is difficult to detect a failure, based on the existence/non-existence of these error messages.

In the above-mentioned method (2), packet capturers must be disposed in places where packets generated due to a failure flow. Therefore, if monitoring a wide network, a lot of packet capturers must be disposed. Furthermore, since a lot of full packet data must be recorded at high speed, a lot of resources must be consumed for that purpose. Accordingly, such a failure detecting method using a packet capturer is not practical since it costs greatly.

SUMMARY OF THE INVENTION

It is an object of the present invention to provide a failure detecting apparatus for detecting failures caused within a communication network in an early stage where its influence is relatively small, at a low cost.

The failure detecting apparatus of the present invention comprises a storage device, a computation device and a determination device. The apparatus detects network failures, based on information obtained from monitor target equipment, which has a plurality of communication interfaces and is disposed within the communication network.

The storage device stores traffic flow rate information indicating the respective amounts of receiving and transmitting traffic in each interface of the monitor target equipment. The computation device computes the flow rate of abnormal traffic, of a plurality of segments of traffic inside the monitor target equipment, and outputs the computed rate of flow as the amount of abnormal traffic. The determination device determines whether there is a network failure, using the amount of abnormal traffic, and outputs the determined result.

DESCRIPTION OF THE PREFERRED EMBODIMENTS

The preferred embodiments of the present invention are described below with reference to the drawings.

Figure 1:
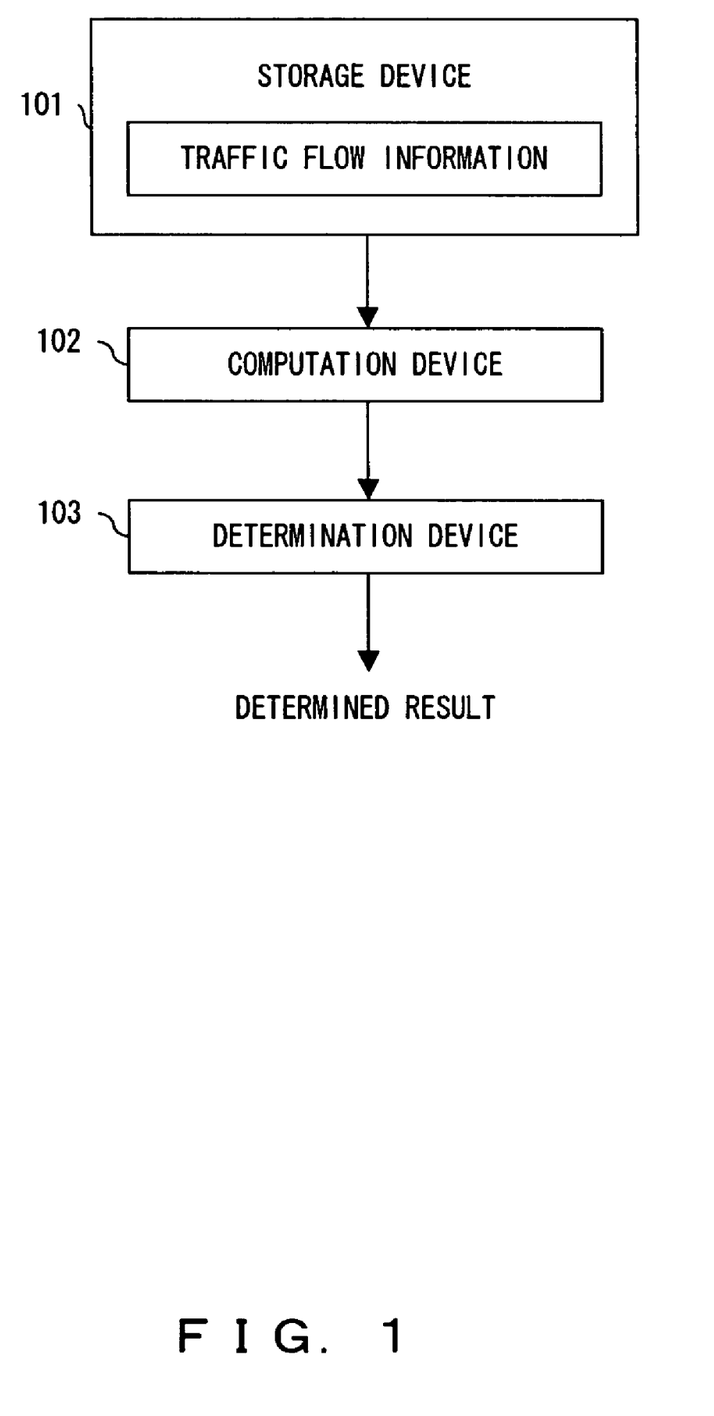
FIG. 1 shows the basic principle of the failure detecting apparatus of the present invention.

FIG. 1 shows the basic principle of the failure detecting apparatus of the present invention. The failure detecting apparatus shown in FIG. 1 comprises a storage device 101, a computation device 102 and a determination device 103. The apparatus detects network failures, based on information obtained from monitor target equipment, which has a plurality of communication interfaces and is disposed within the communication network.

The storage device 101 stores traffic flow rate information indicating the respective amounts of receiving and transmitting traffic in each interface of the monitor target equipment. The computation device 102 computes the flow of abnormal traffic, of a plurality of segments of traffic inside the monitor target equipment using the traffic flow rate information, and outputs the computed flow as the amount of abnormal traffic. The determination device 103 determines whether there is a network failure, using the amount of abnormal traffic, and outputs the determined result.

The storage device 101, for example, corresponds to the traffic flow recording device 312 shown later in FIG. 3 and the traffic flow recording device 801 shown later in FIG. 8. The computation device 102, for example, corresponds to the traffic flow analyzing device 313 and abnormal traffic amount computing device 314 shown in FIG. 3, and the traffic flow analyzing device 802 and abnormal traffic amount computing device 803 shown in FIG. 8. The determining device 103, for example, corresponds to the failure determining device 315 shown in FIG. 3 and the failure determining device 804 shown in FIG. 8.

According to the present invention, the existence/non-existence of a network failure can be determined by analyzing easily obtainable traffic flow information and detecting the amount of traffic that abnormally flows, based on the information. Therefore, abnormal traffic inside a network can be distinguished without relying on an error message generated within the network or without locating a special packet capturer in the network. Accordingly, in a wide communication network, the occurrence of a failure can be detected in an early stage where the influence of the failure is small, at a low cost.

Figure 2:
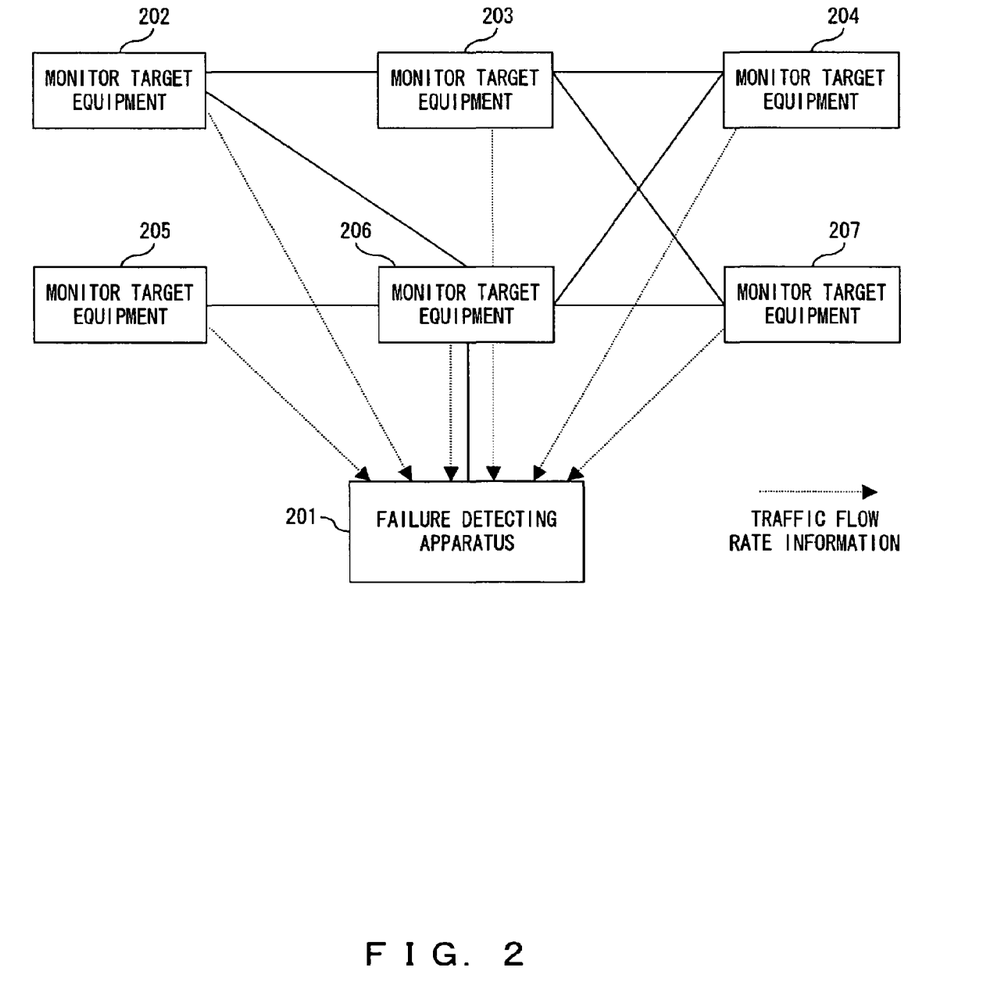
FIG. 2 shows a first network configuration.

FIG. 2 shows the network configuration used to implement the present invention. In the network configuration shown in FIG. 2, a failure detecting apparatus 201 collects traffic flow information from monitor target equipments 202 through 207, such as a plurality of repeaters inside the communication network and the like, and determines whether there is a failure in these monitor target equipments. In this example, although, for convenience sake, six segments of monitor target equipment are used, the number of monitor target equipment is generally arbitrary.

Figure 3:
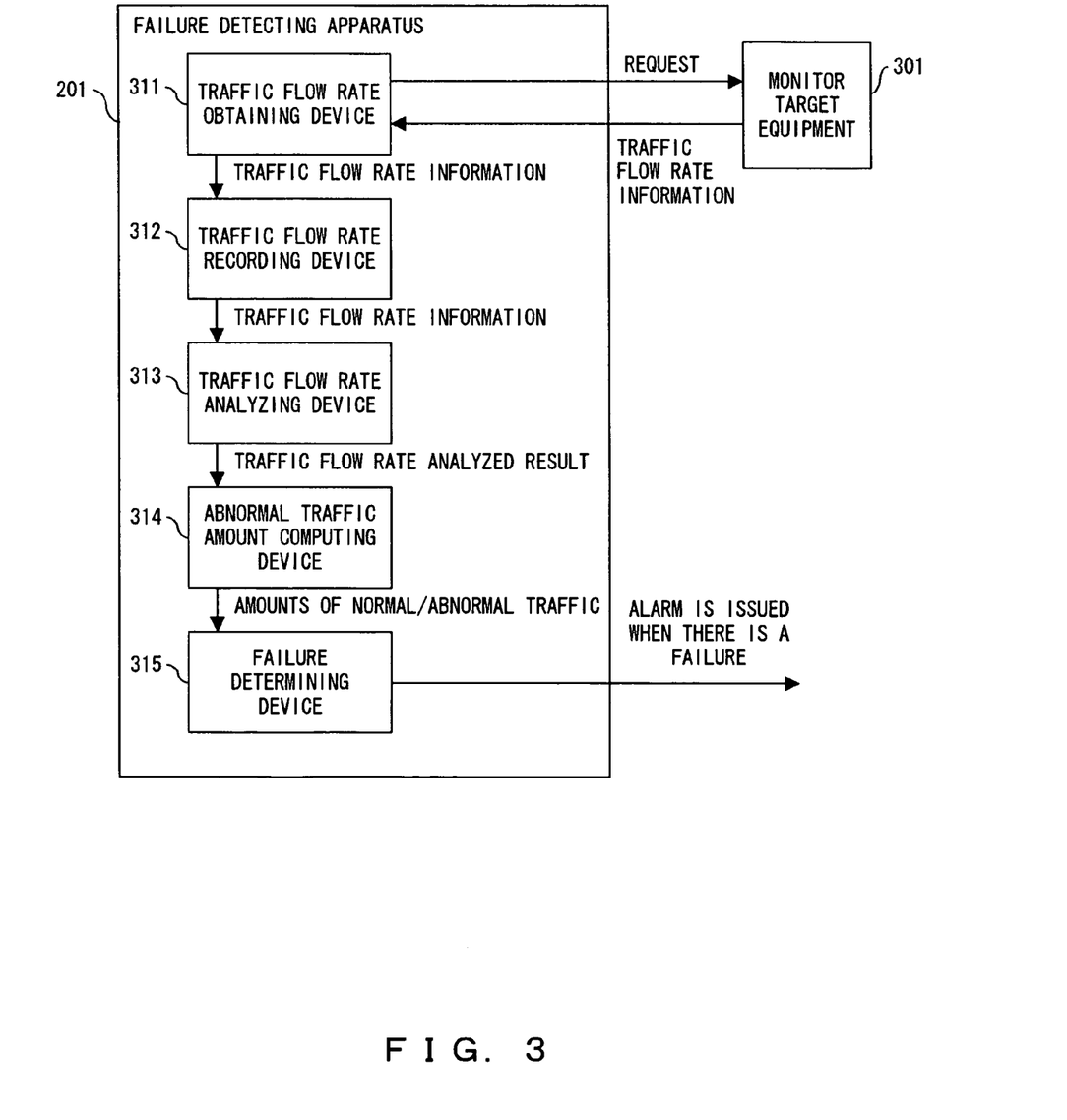
FIG. 3 shows a first failure detecting apparatus.

As shown in FIG. 3, the failure detecting apparatus 201 comprises a traffic flow obtaining device 311, a traffic flow recording device 312, a traffic flow analyzing device 313 and an abnormal traffic amount computing device 314 and a failure determining device 315. The apparatus 201 detects failures inside the network. The monitor target equipment 301 corresponds to one of the plurality of monitor target equipments 202 through 207.

Figure 4:
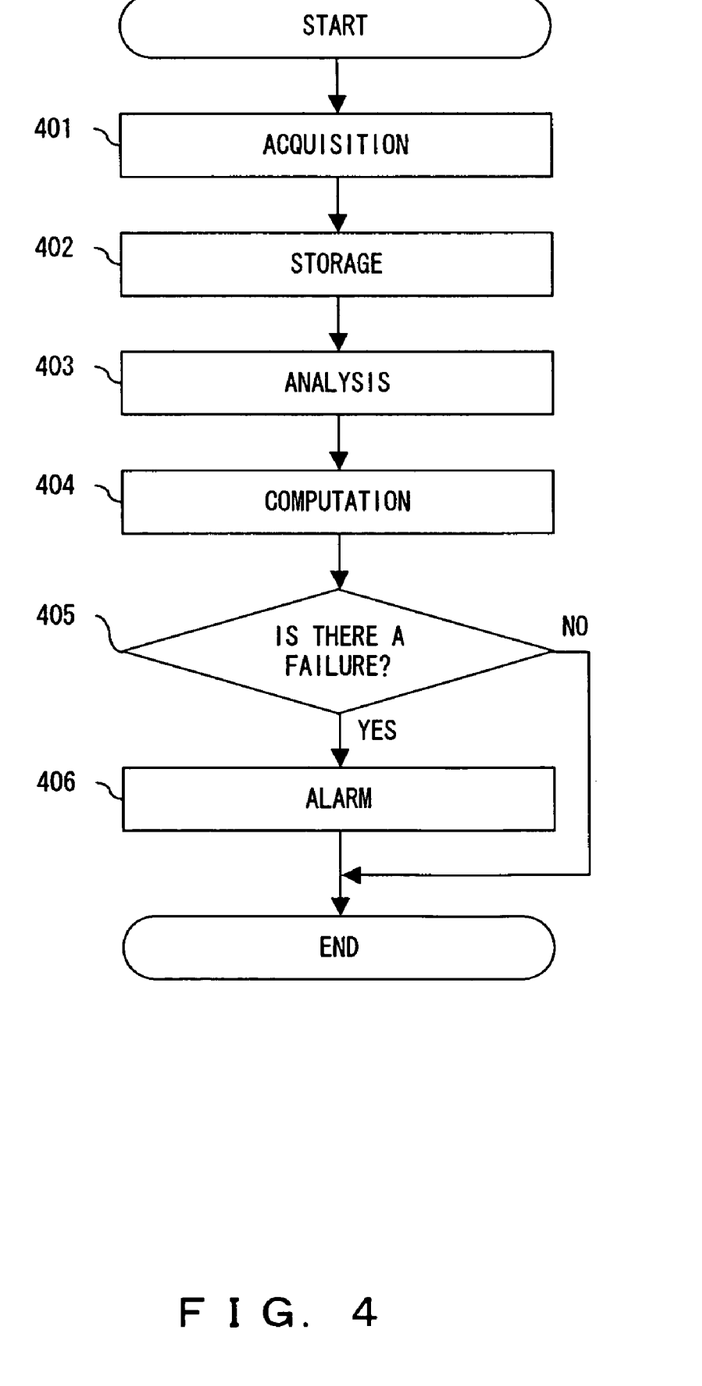
FIG. 4 is a flowchart showing a failure detecting process.

FIG. 4 is a flowchart showing the failure detecting process of the failure detecting apparatus 201 shown in FIG. 3. The failure detecting procedure shown in FIG. 4 is as follows:

Step S401:

The traffic flow obtaining device 311 issues a request for traffic flow information stored in the monitor target equipment 301, to the monitor target equipment 301. In response to the request, the monitor target equipment 301 transmits the traffic flow information that it stores to the failure detecting device 201. For example, in the case of an IP network, for this traffic flow information, the number of input/output packets in each interface and the number of input/output octets or the like which are stored in the Management Information Base-II (MIB-II) database of the monitor target equipment 301 are used. For the request issued by the traffic flow obtaining device 311, the get request of Simple Network Management Protocol (SNMP) or the like is used.

Step 402:

When the traffic flow obtaining device 311 obtains the traffic flow information of the monitor target equipment 301, the traffic flow recording device 312 records the traffic flow information.

Step 403:

The traffic flow analyzing device 313 analyzes the traffic flow, using the recorded traffic flow information. In this case, analysis means to catch the general flow of traffic instead of checking the data or behavior of an individual packet that flows through the network. For example, the device 313 estimates from which interface of the monitor target equipment 301 traffic is inputted or to which interface thereof the traffic is outputted, based on the traffic flow information in each interface.

Figure 5:
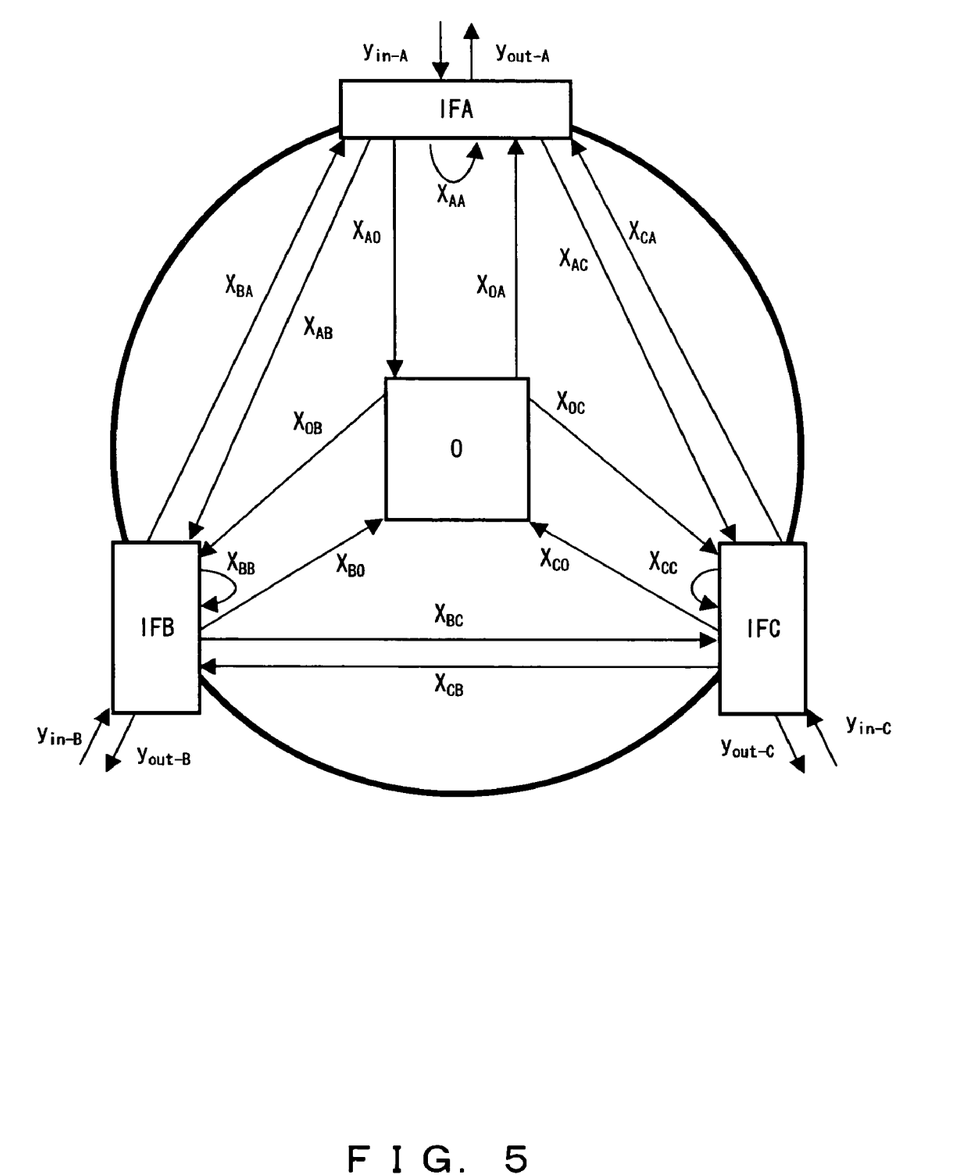
FIG. 5 shows a first model monitor target equipment.

For example, if the monitor target equipment 301 is a router with three interfaces, this router can be expressed by the model shown in FIG. 5. In this model it is assumed that the router has three interfaces, A, B and C, and that available traffic flow information is the amount of receiving traffic ($y_{in-A}$, $y_{in-B}$ and $y_{in-C}$) and amount of transmitting traffic ($y_{out-A}$, $y_{out-B}$ and $y_{out-C}$) per unit time period in the interfaces.

It is also assumed that there is an element O indicating a virtual point indicating the end of traffic, which terminates inside the router or the starting point of traffic where the router is a transmitting source inside the router. Furthermore, it is assumed that inside the router, the amount of traffic from $\alpha$ ($\alpha\epsilon\{A, B, C, O\}$) as a start point to $\beta$ ($\beta\epsilon\{A, B, C, O\}$) as an end point is described as $x_{\alpha\beta}$ and all traffic transmitted/received to/from this router is counted in one of a plurality of $x_{\alpha\beta}$. In this case, the following simultaneous equation holds true.

$$Y = \begin{pmatrix} y_{in-A} \\ y_{in-B} \\ y_{in-C} \\ y_{out-A} \\ y_{out-B} \\ y_{out-C} \end{pmatrix} \quad (1)$$

$$X = \begin{pmatrix} x_{AA} \\ x_{AB} \\ x_{AC} \\ x_{BA} \\ x_{BB} \\ x_{BC} \\ x_{CA} \\ x_{CB} \\ x_{CC} \\ x_{AO} \\ x_{BO} \\ x_{CO} \\ x_{OA} \\ x_{OB} \\ x_{OC} \end{pmatrix} \quad (2)$$

$$A = \begin{pmatrix} 1 & 1 & 1 & 0 & 0 & 0 & 0 & 0 & 0 & 1 & 0 & 0 & 0 & 0 & 0 \\ 0 & 0 & 0 & 1 & 1 & 1 & 0 & 0 & 0 & 0 & 1 & 0 & 0 & 0 & 0 \\ 0 & 0 & 0 & 0 & 0 & 0 & 1 & 1 & 1 & 0 & 0 & 1 & 0 & 0 & 0 \\ 1 & 0 & 0 & 1 & 0 & 0 & 1 & 0 & 0 & 0 & 0 & 0 & 1 & 0 & 0 \\ 0 & 1 & 0 & 0 & 1 & 0 & 0 & 1 & 0 & 0 & 0 & 0 & 0 & 1 & 0 \\ 0 & 0 & 1 & 0 & 0 & 1 & 0 & 0 & 1 & 0 & 0 & 0 & 0 & 0 & 1 \end{pmatrix} \quad (3)$$

$$Y = AX \quad (4)$$

However, although in equation (4), there are 15 unknown $x_{\alpha\beta}$ indicating the flow of traffic inside the router for 6 equations, this simultaneous equation cannot be analytically solved. Therefore, the traffic flow analyzing device 313 estimates each $x_{\alpha\beta}$, based on the amount of receiving traffic ($y_{in-A}$, $y_{in-B}$ and $y_{in-C}$) and amount of transmitting traffic ($y_{out-A}$, $y_{out-B}$ and $y_{out-C}$) per unit time period. For this estimation, for example, Traffic Matrix Estimation, which is disclosed in the earlier-mentioned Non-patent References 3 and 4, is used.

Step 404:

When the traffic flow analyzing device 313 estimates traffic between the interfaces of the monitor target equipment 301, the abnormal traffic amount computing device 314 computes the amount of abnormal traffic that does not meet the purpose of the monitor target equipment 301, of the obtained traffic.

For example, if the monitor target equipment 301 is a repeater, such as a router, switch and the like, the main purpose of the equipment is to transfer data received from the outside to another place. Therefore, the respective amounts of data that is generated and outputted by this monitor target equipment 301, of data that is terminated and discarded at this equipment and of data transmitted from an interface that receives data must be usually very little. If there is a great amount of such data, it can be considered that there is some failure.

Therefore, the abnormal traffic amount computing device 314 counts these amounts of data and the amount of the other data as the amount of abnormal traffic and the amount of normal traffic, respectively, and transfers the obtained amounts of normal/abnormal traffic to the failure determining device 315.

In the case of the model shown in FIG. 5, of $x_{\alpha\beta}$ estimated by the traffic flow rate analyzing device 313, $x_{AA}$, $x_{BB}$, $x_{CC}$, $x_{AO}$, $x_{BO}$, $x_{CO}$, $x_{OA}$, $x_{OB}$ and $x_{OC}$ are counted as the amounts of abnormal traffic. $x_{AA}$, $x_{BB}$ and $x_{CC}$ indicate the amounts of loop traffic that are transmitted from an interface that receives data. $x_{AO}$, $x_{BO}$ and $x_{CO}$ indicate the amounts of traffic that is discarded within the router. $x_{OA}$, $x_{OB}$ and $x_{OC}$ indicate the amounts of traffic, which are generated inside and outputted from the router. Therefore, the abnormal traffic amount computing device 314 computes the total amounts of these segments of traffic.

Step 405:

The failure determining device 315 determines whether there is a failure, based on the amounts of normal/abnormal traffic computed by the abnormal traffic amount computing device 314. In this case, if the total amount of abnormal traffic exceeds a predetermined threshold value designated by the network manager or the like, the device 315 determines that there is a failure.

In the case of the model shown in FIG. 5, the ratio of the amount of abnormal traffic to the total amount of traffic inside the router can be computed using the following evaluation function f(X):

$$f(X) = \frac{\sum_{\mu}(x_{\mu o} + x_{o\mu} + x_{\mu\mu})}{\sum_{\mu}\sum_{v}x_{\mu v} + \sum_{\mu}(x_{\mu o} + x_{o\mu})} \quad (5)$$

$(\mu, v \equiv \{A, B, C\})$

The numerator of the right side member of equation (5) indicates the total amount of abnormal traffic. The denominator of the right side member of equation (5) indicates the total amount of traffic, obtained by adding the total amount of normal traffic to the total amount of abnormal traffic. The failure determining device 315 compares the solution of this f(X) with the predetermined threshold value. If the solution exceeds the threshold value, the device 315 determines that there is a failure. For example, if the allowable amount of abnormal traffic is 10% of the total amount of traffic, the threshold value is set to 0.1.

Step 406:

If the failure determining device 315 determines that there is a failure in step 405, it issues an alarm and notifies the network manager or the like of the occurrence of a failure.

In FIG. 5, a router model has three interfaces. Even if the number of interfaces is more than three, failures can be detected by building the similar model.

For the monitor target equipment 301 other than a repeater, such as a router and the like, equipment that plays a role of a gateway, such as a firewall, a proxy server and the like considered used. Such monitor target equipment can be expressed by the model shown in FIG. 6. In this model, the monitor target equipment has two interfaces A and B, and the amount of receiving traffic ($y_{in-A}$ and $y_{in-B}$) and amount of transmitting traffic ($y_{out-A}$ and $y_{out-B}$) per unit time period at respective interfaces are obtained as traffic flow information.

Figure 6:
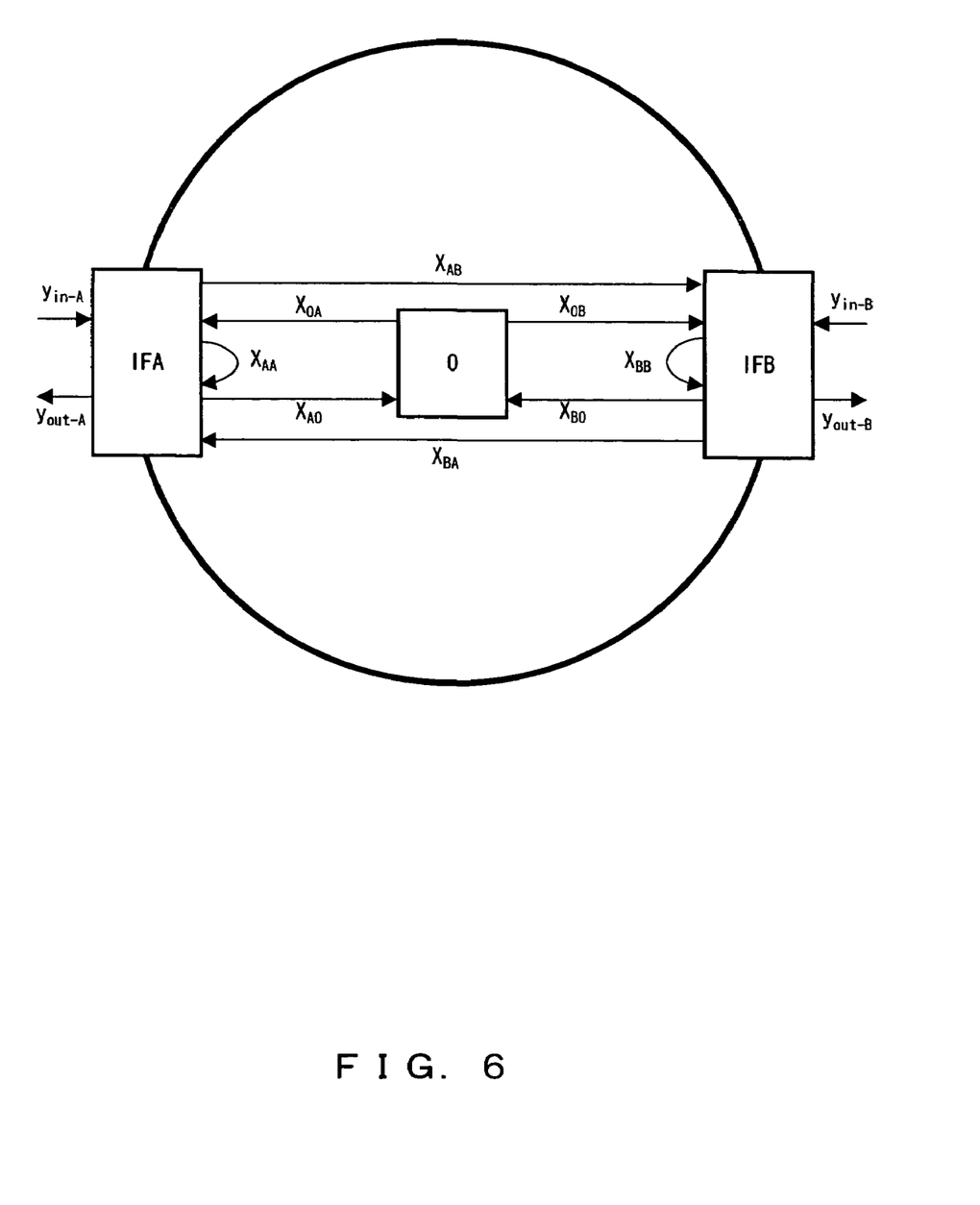
FIG. 6 shows a second model monitor target equipment.

In this case, it is assumed that there is a virtual point O indicating the end or starting point of traffic and that the amount of traffic from $\alpha(\alpha\epsilon\{A, B, O\})$ as a start point to $\beta(\beta\epsilon\{A, B, O\})$ as an end point is described as $x_{\alpha\beta}$. In this case, too, as in the case of the model shown in FIG. 5, each $x_{\alpha\beta}$ can be estimated by Traffic Matrix Estimation, according to a simultaneous equation in which $x_{\alpha\beta}$ is an unknown factor.

Figure 7:
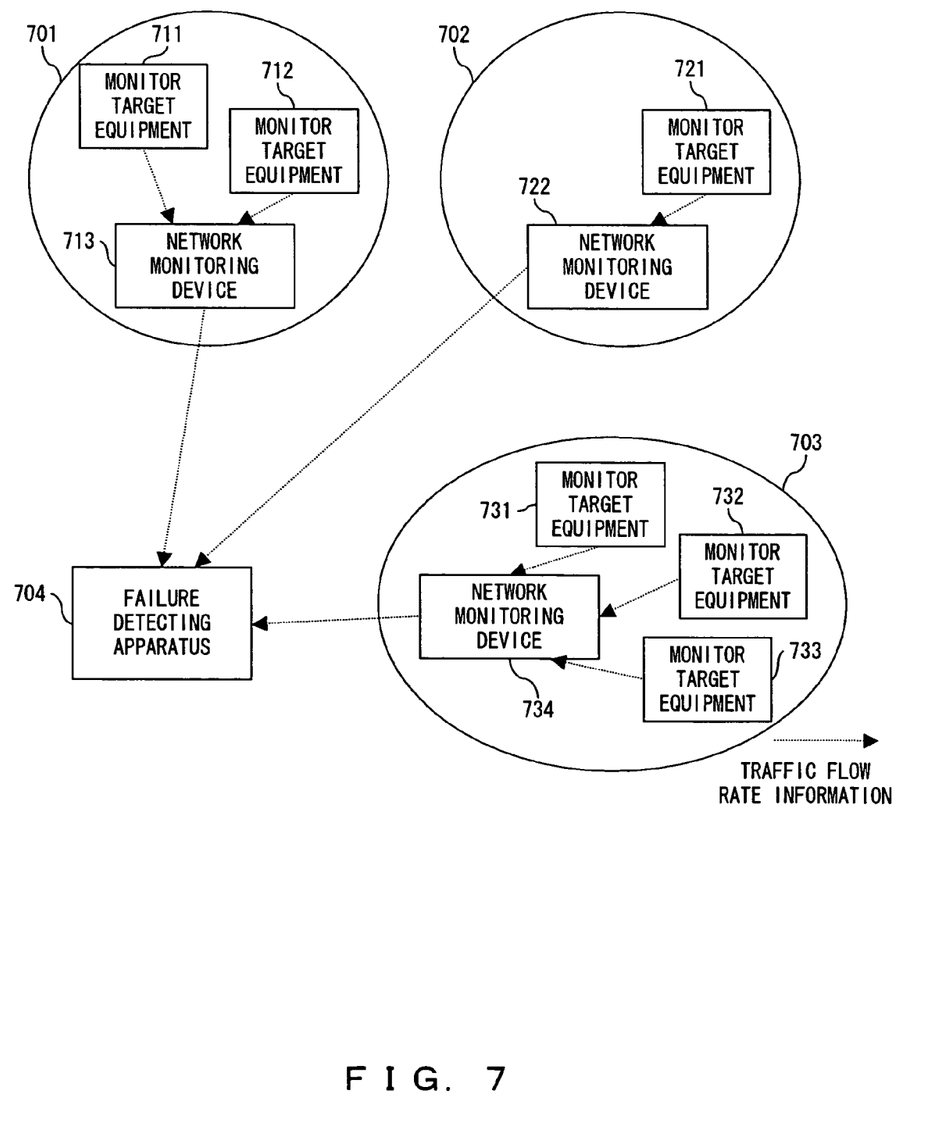
FIG. 7 shows a second network configuration.

FIG. 7 shows another network configuration used to implement the present invention. In the network configuration shown in FIG. 7, a communication network 701 comprises monitor target equipment 711 and 712, and a network monitoring device 713. A communication network 702 comprises monitor target equipment 721 and a network monitoring device 722. A communication network 703 comprises monitor target equipment 731, 732 and 733, and a network monitoring device 734.

Figure 8:
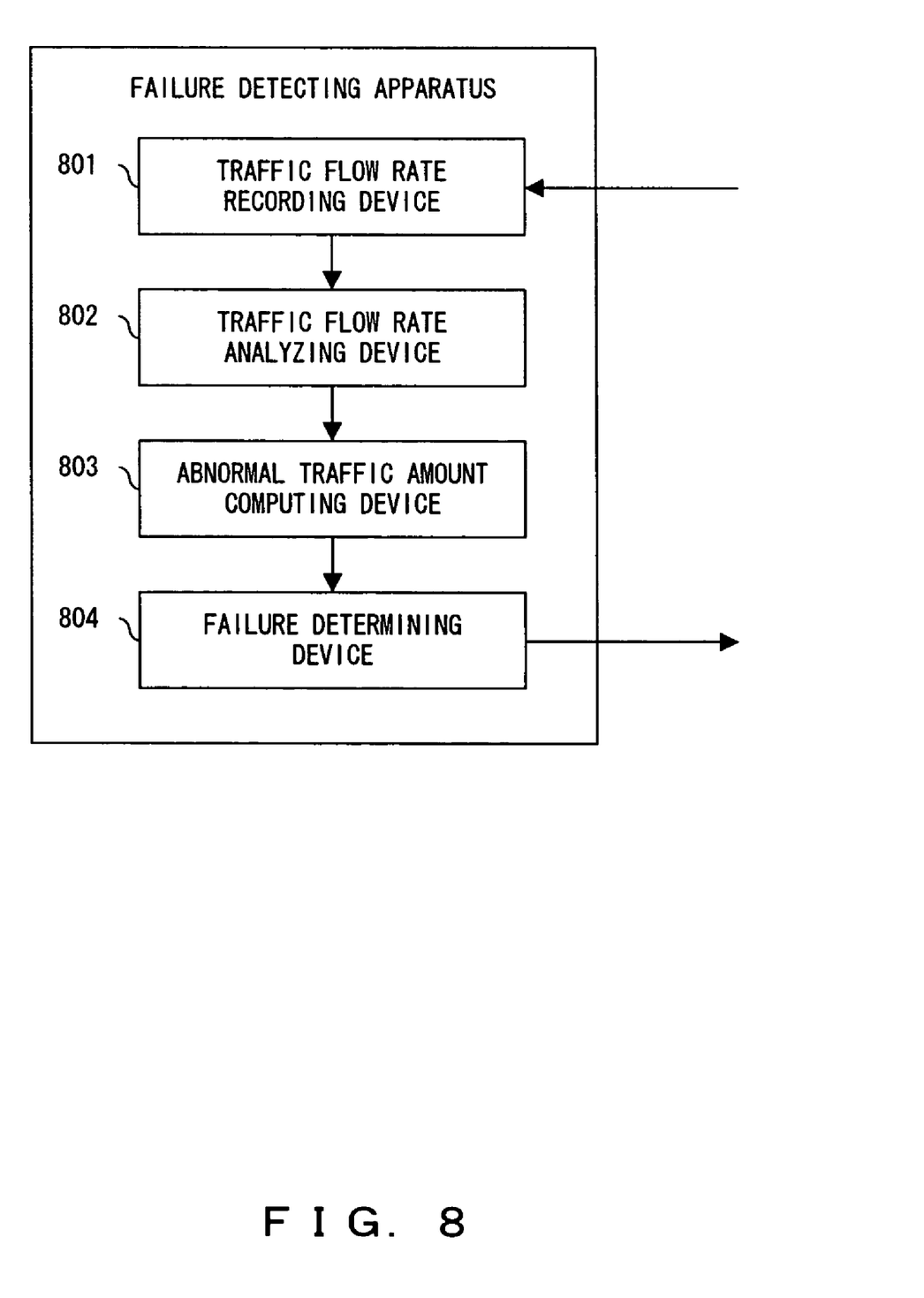
FIG. 8 shows a second failure detecting apparatus.

A failure detecting apparatus 704 is provided outside the communication networks 701, 702 and 703, and as shown in FIG. 8, it comprises a traffic flow recording device 801, a traffic flow analyzing device 802, an abnormal traffic amount computing device 803 and a failure determining device 804.

Figure 9:
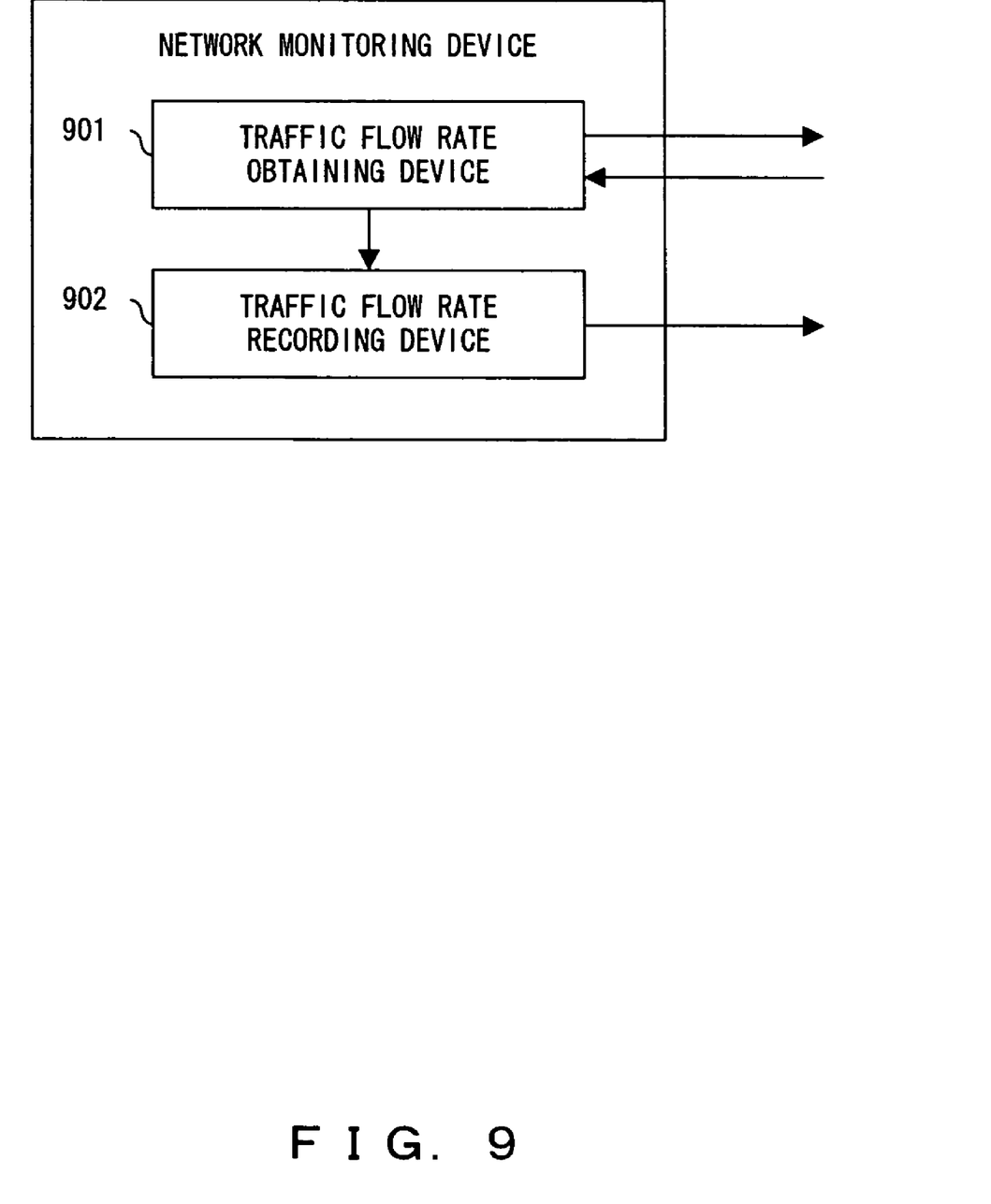
FIG. 9 shows the configuration of a network monitoring device.

As shown in FIG. 9, each of the network monitoring devices 713, 722 and 734 comprises a traffic flow obtaining device 901 and a traffic flow recording device 902. Each network monitoring device obtains traffic flow information from the monitor target equipment in each network and transmits the information to the failure detecting device 704. Then, the failure detecting device 704 detects a failure inside each network, using the traffic flow information transmitted from each network monitoring device.

The functions of the traffic flow recording device 801, traffic flow analyzing device 802, abnormal traffic amount computing device 803 and failure determining device 804 shown in FIG. 8 are basically the same as the those of the traffic flow recording device 312, traffic flow analyzing device 313, abnormal traffic amount computing device 314 and failure determining device 315 shown in FIG. 3, respectively. The functions of the traffic flow obtaining device 901 and traffic flow recording device 902 shown in FIG. 9 are basically the same as those of the traffic flow obtaining device 311 and traffic flow recording device 312 shown in FIG. 3, respectively.

Such a network configuration is effective if it is difficult to access the inside of the network from the outside where the monitor target equipment is disposed. In such a configuration, it is sufficient if the failure detecting device 704 records traffic flow information transmitted from a network monitoring device disposed inside each network. Therefore, even if the failure detecting device 704 cannot directly communicate with each monitor target equipment, the occurrence/non-occurrence of a failure in the monitor target equipment can be determined.

Figure 10:
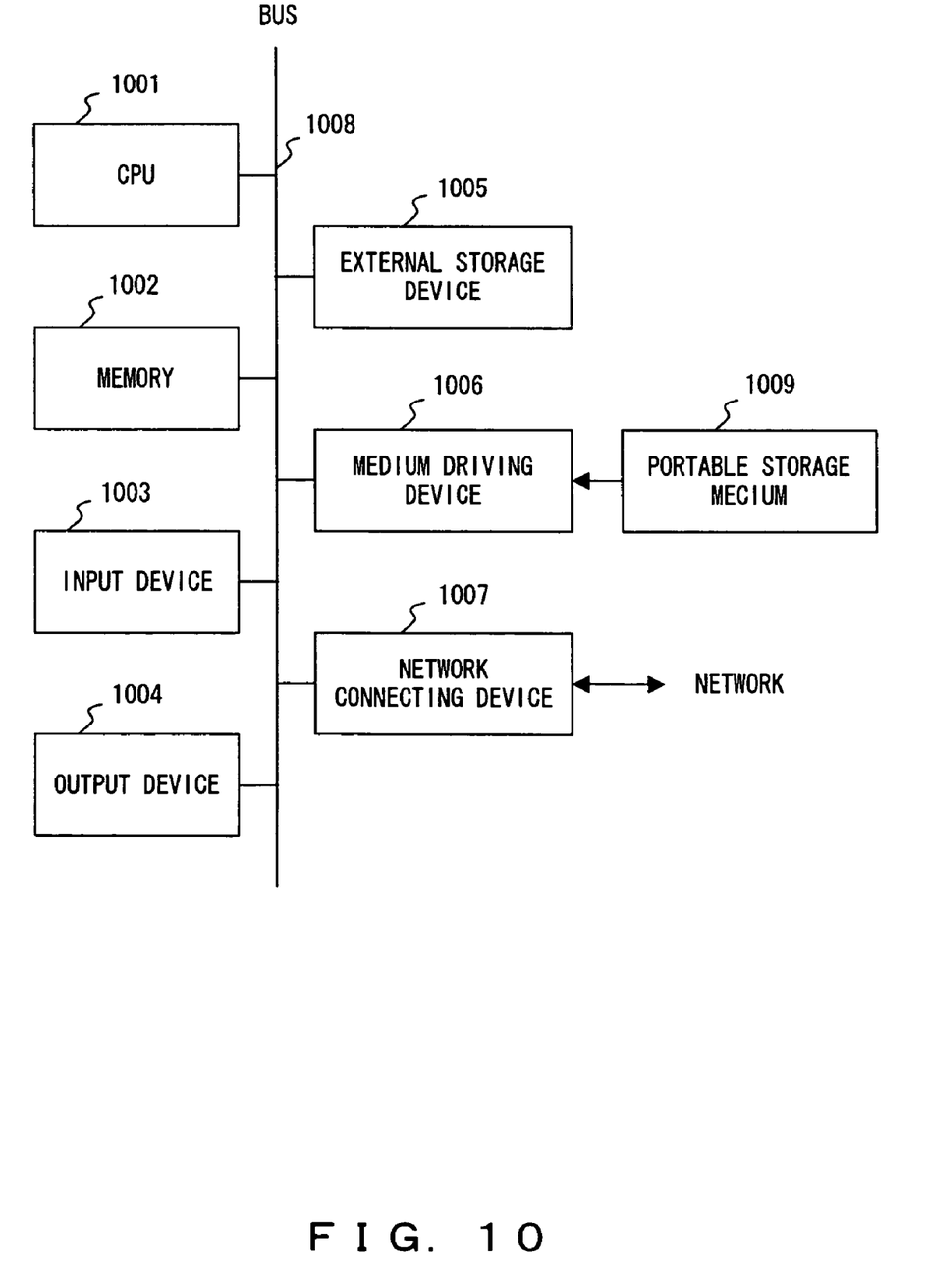
FIG. 10 shows the configuration of a data processing device.

Both the failure detecting devices shown in FIGS. 3 and 8 and the network monitoring device shown in FIG. 9 can be configured using the data processing device (computer) shown in FIG. 10. The data processing device shown in FIG. 10 comprises a CPU (central processing unit) 1001, memory 1002, an input device 1003, an output device 1004, an external storage device 1005, a medium driving device 1006 and a network connecting device 1007, which are connected to each other through a bus 1008.

For the memory 1002, an ROM (read-only memory), an RAM (random access memory) and the like are used. The memory 1002 stores a program and data used for the process. The CPU 1001 performs necessary processes by using the memory 1002 and executing the program.

The traffic flow recording device 312 shown in FIG. 3, the traffic flow recording device 801 shown in FIG. 8 and the traffic flow recording device 902 shown in FIG. 9 corresponds to the memory 1002. The traffic flow obtaining device 311, traffic flow analyzing device 313, abnormal traffic amount computing device 314 and failure determining device 315 which are shown in FIG. 3, the traffic flow analyzing device 802, abnormal traffic computing device 803 and failure determining device 804 which are shown in FIG. 8 and the traffic flow obtaining device 901 which are shown in FIG. 9 correspond to the respective functions implemented by executing the program stored in the memory 1002.

For the input device 1003, a keyboard, a pointing device, a touch panel and the like are used. The input device 1003 is used for an operator, such as a network manager and the like to input instructions and information. For the output device 1004, a display, a printer, a speaker and the like are used to make an inquiries, to issue alarms, to output the result of a process, etc.

For the external storage device 1005, a magnetic disk device, an optical disk device, a magneto-optical disk device, a tape device and the like are used. The data processing device stores in advance the above-mentioned program and data in the external storage device 1005 and uses them by loading them onto the memory 1002, as requested.

The medium driving device 1006 drives a portable storage medium 1009 and accesses its recorded contents. For the portable storage medium 1009, an arbitrary computer-readable storage medium, such as a memory card, a flexible disk, a CD-ROM (compact disk read-only memory), an optical disk, a magneto-optical disk and the like is used. The operator stores in advance the above-mentioned program and data in this portable storage medium, and uses them by loading them onto the memory 1002, as requested.

The network connecting device 1007 is connected to an arbitrary communication network, such as a LAN (local area network), the Internet or the like, and converts data accompanying communication. The data processing device receives the above-mentioned program and data from an external device through the network connecting device 1007, as requested, and uses them by loading them onto the memory 1002.

Figure 11:
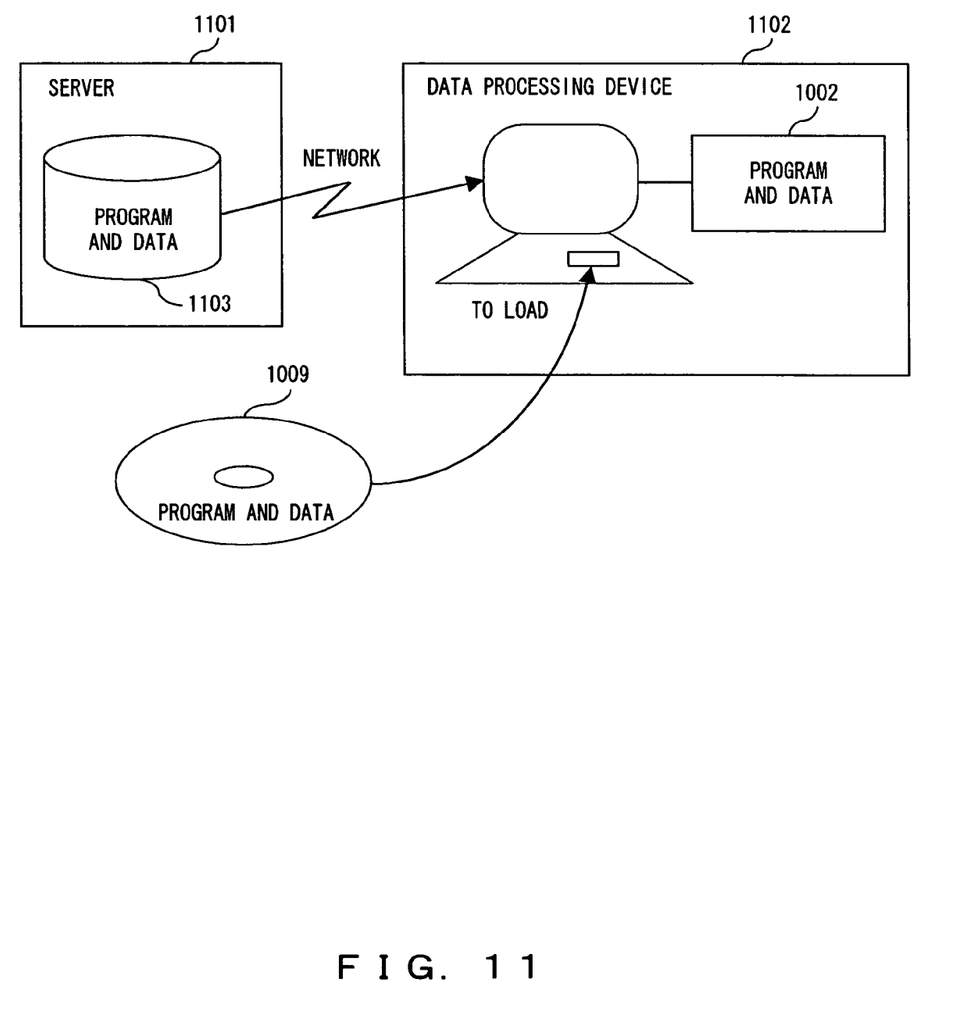
FIG. 11 shows examples of storage media.

FIG. 11 shows examples of computer-readable storage media for providing the data processing device shown in FIG. 10 with the above-mentioned program and data. The program and data stored in the portable storage medium 1009 or the database 1103 of a server 1101 are loaded onto the memory 1002 of the data processing device 1102. The server 1101 generates a carrier signal for carrying the above-mentioned program and data and transmits them to the data processing device 1102 through an arbitrary transmission medium on the network. The CPU 1001 performs necessary processes, by using the data and executing the program.

What is claimed is:

1. A computer-readable storage medium encoded with a computer program that when executed causes a computer to execute a method that detects network failures, based on information obtained from monitor target equipment which is disposed within a communication network and which has a plurality of communication interfaces, said method comprising:

extracting traffic flow information indicating both an amount of receiving traffic and an amount of transmitting traffic in each interface of the monitor target equipment, from a storage device of the computer;

setting a virtual point indicating the end or the starting point of the traffic inside the monitor target equipment computing an amount of abnormal traffic using a virtual point set in the monitor target equipment, among a plurality of segments of traffic inside the monitor target equipment, and using the traffic flow information to compute a first traffic flow using each interface and another interface as a starting point and an end point, respectively, of the traffic inside the monitor target equipment, a second traffic flow using each interface and the virtual point as the starting point and the end, respectively, a third traffic flow using the virtual point and each interface as the starting point and the end, respectively, and a fourth traffic flow using each interface as both the starting point and the end and computes a first total of the second, third and fourth traffic flows as the amount of abnormal traffic; and determining whether there is a network failure based on the amount of the abnormal traffic.

2. The computer-readable storage medium according to claim 1, wherein said computing includes computing a ratio of the amount of abnormal traffic to a second total of the first, second, third and fourth traffic flows, and to wherein said determining determines that the network failure exists if the ratio of the amount of abnormal traffic exceeds a predetermined threshold value.

* * * * *